Figure 1:
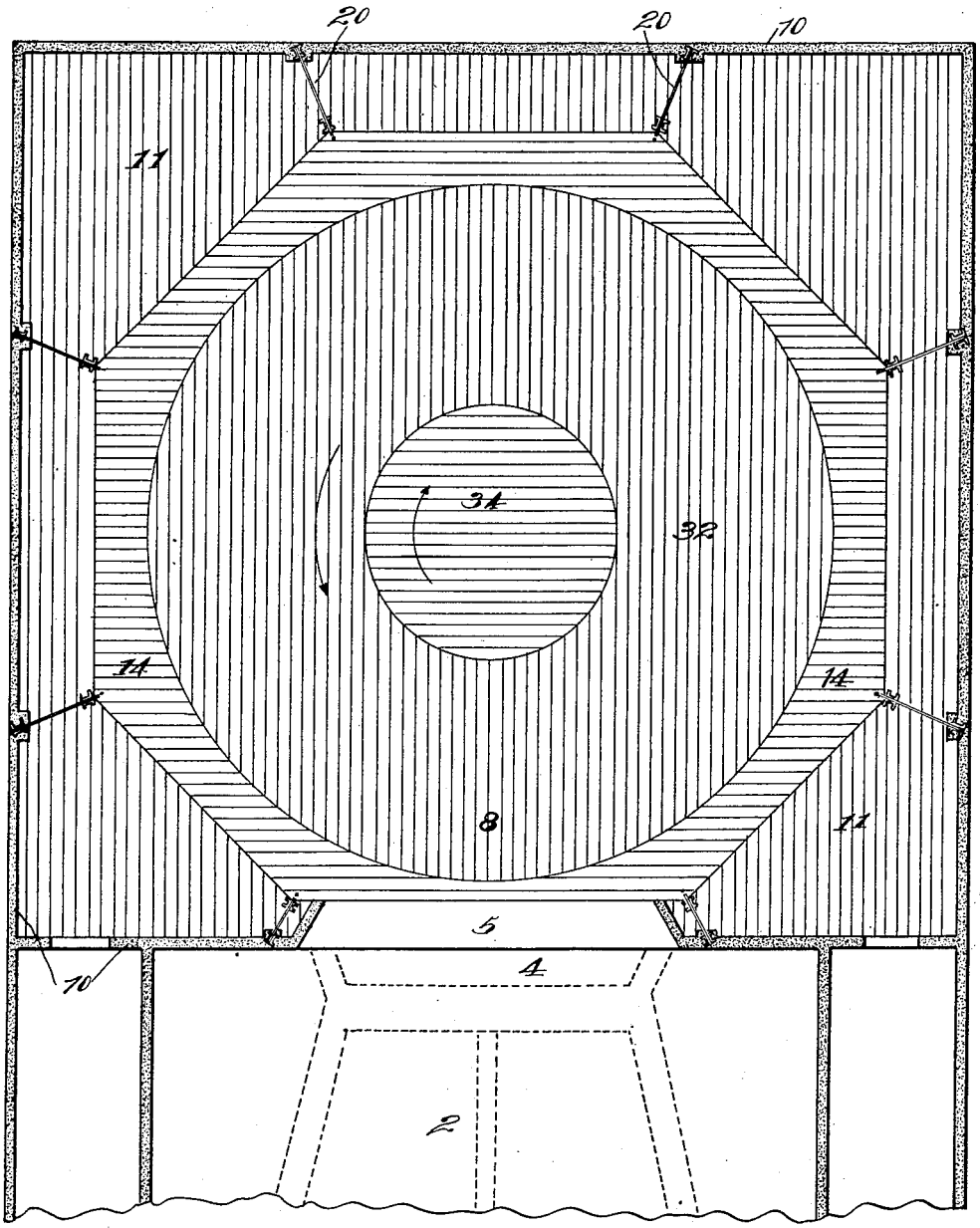

H. W. BISHOP.
THEATER AND STAGE CONSTRUCTION.
APPLICATION FILED DEC. 14, 1908.

1,008,886.

Patented Nov. 14, 1911.
3 SHEETS—SHEET 1.

WITNESSES

INVENTOR
Harry W. Bishop;
BY
his ATTORNEY

H. W. BISHOP.
THEATER AND STAGE CONSTRUCTION.
APPLICATION FILED DEC. 14, 1908.

1,008,886.

Patented Nov. 14, 1911.

3 SHEETS—SHEET 2.

WITNESSES

INVENTOR:
Harry W. Bishop;
BY Geo. H. Strong
his ATTORNEY

H. W. BISHOP.
THEATER AND STAGE CONSTRUCTION.
APPLICATION FILED DEC. 14, 1908.
1,008,886.
Patented Nov. 14, 1911.
3 SHEETS—SHEET 3.
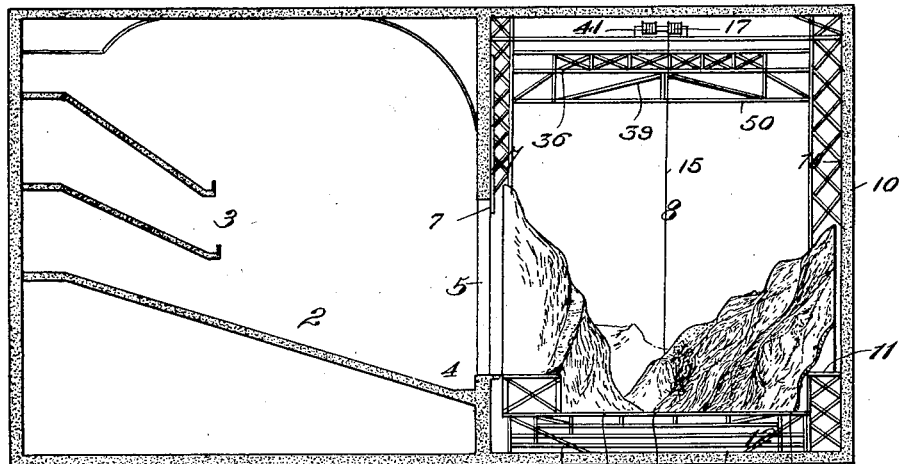
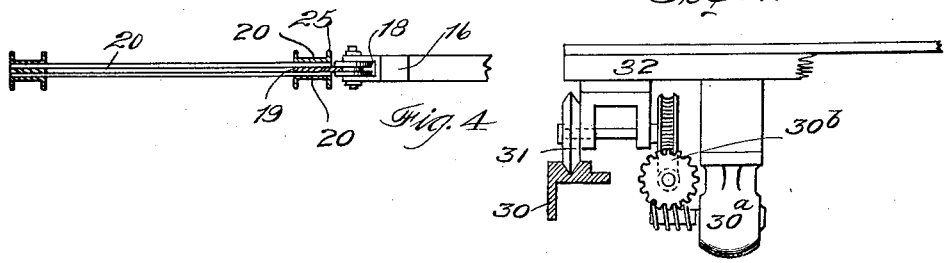
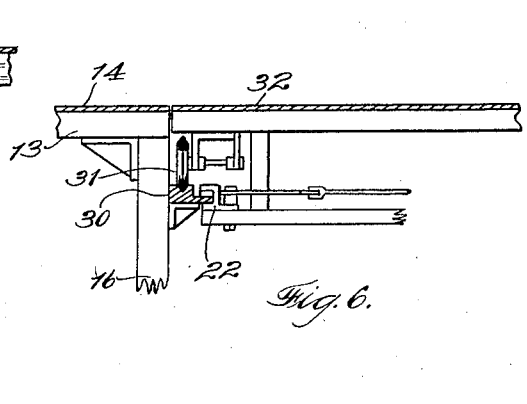
WITNESSES
INVENTOR:
Harry W. Bishop;
BY Geo. H. Strong.
ATTORNEY

UNITED STATES PATENT OFFICE.

HARRY W. BISHOP, OF OAKLAND, CALIFORNIA.

THEATER AND STAGE CONSTRUCTION.

1,008,886.     Specification of Letters Patent.     Patented Nov. 14, 1911.

Application filed December 14, 1908. Serial No. 467,464.

*To all whom it may concern:*

Be it known that I, HARRY W. BISHOP, citizen of the United States, residing at Oakland, in the county of Alameda and State of California, have invented new and useful Improvements in Theater and Stage Construction, of which the following is a specification.

My invention relates to a horizontally revoluble and vertically movable stage, a central portion of which is independently revoluble, and a horizontally revoluble and vertically movable gridiron or rigging loft, the carriage of which upon its upper portion is provided with an independently revoluble platform.

The principal advantages of my invention are in the possibility of setting up all the scenes each completely, on the surface of the stage, the area of which may be divided into scenes as desired, and of suspending all the drops, hanging pieces, ceiling borders, ceiling pieces and border and other overhead lights that may be used, for all the scenes each completely, from the gridiron or rigging-loft, and of then revolving the stage and the rigging loft in a horizontal plane so that each scene is, in its proper sequence, alined proximate to the proscenium.

It is an important desideratum to devise a theatrical structure that will admit of building or setting scenes of as nearly normal and natural effect as is possible to attain, by elevating or lowering all of the visible matter within the postscenium. It is, therefore, desirable to be able to raise or lower certain scenes, according to the setting of the act, as well as to rotate either the whole stage, or a part of the stage, or to rotate portions of the stage independently of each other.

It is an object of this invention to provide a theater structurally arranged to permit the elevating or lowering of the main stage; to provide a vertically movable stage horizontally revoluble, and means for accomplishing this action; to afford a stage adapted to be bodily raised or lowered and simultaneously revolved if so desired. Further, it is provided that the stage may be raised or lowered, and have a portion of its area revolving in one direction while another portion is rotating reversely.

It is also desirable to raise or lower certain scenes, suspended from or secured to the rigging-loft, according to the setting of the act on the main stage, and also to lower the revoluble platform carried by the rigging-loft carriage and use it in combination with the main stage, as well as to rotate either the rigging-loft, or the revoluble platform.

Therefore, it is a further object of this invention to provide a revoluble rigging-loft vertically movable and means for accomplishing this action; to afford a rigging-loft adapted to be bodily raised or lowered and to be simultaneously revolved if so desired, or to be raised or lowered or revolved synchronously with the main stage or independently thereof.

Other objects of the invention will be made manifest in the specification and accompanying drawings, in which—

Figure 2:
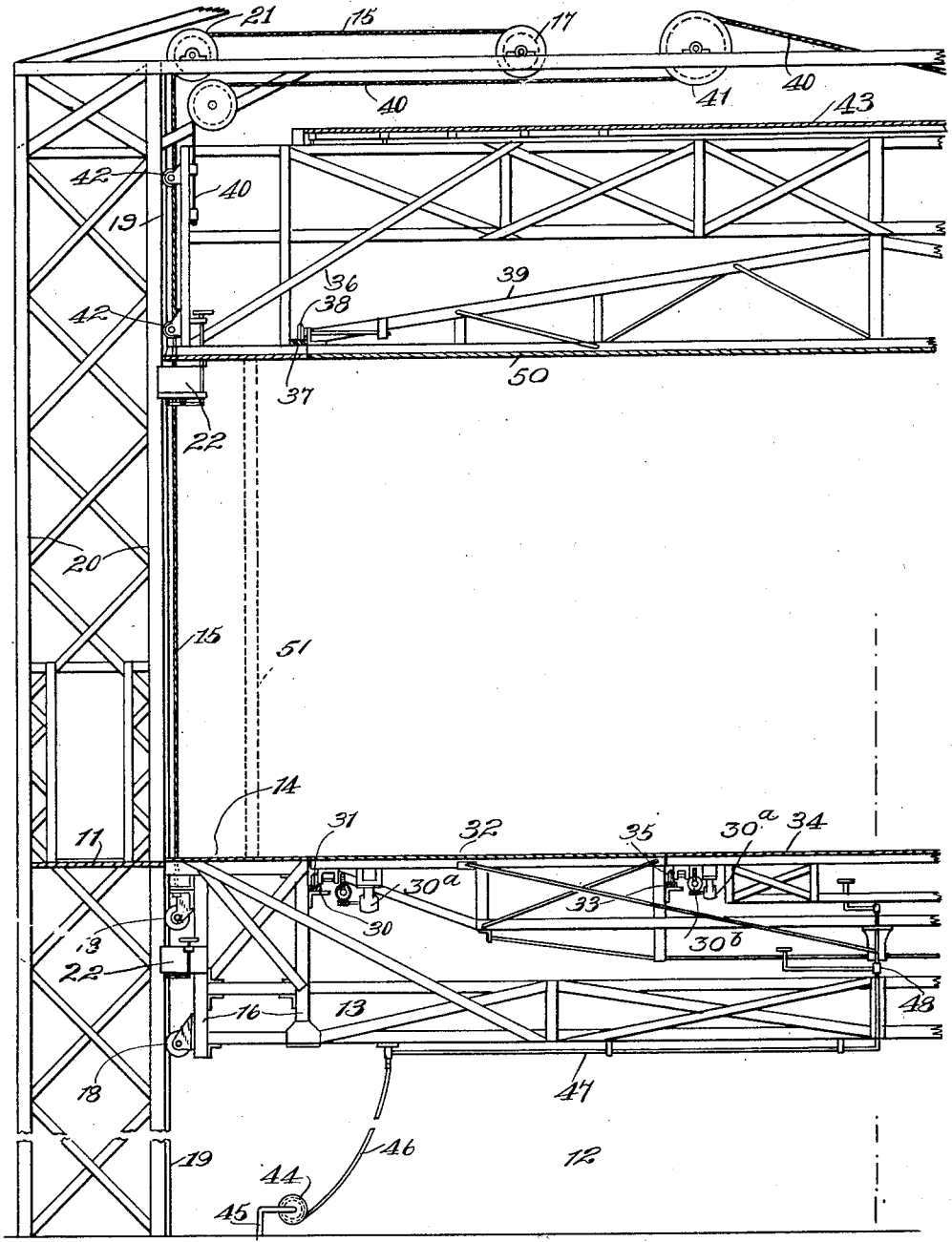

Figure 1 is a partial plan view of the improved theater and stage. Fig. 2 is a vertical section through a portion of the structure. Fig. 3 is a vertical section through the stage, rigging-loft and auditorium, illustrating a view of the stage as adapted to a "setting." Fig. 4 is a detail of the rollers and guide. Fig. 5 is a detail of the brake. Fig. 6 is a detail of the stage-bearing roller and brake. Fig. 7 is a detail of a driving mechanism.

In the embodiment of my invention, the auditorium 2 (see Figs. 1 and 3), galleries 3, orchestra 4, and proscenium 5, are built as usual in the construction of theaters, and the drop curtain 7 divides the house from the postscenium 8. It is upon the postscenium, stage and rigging loft that I wish to lay particular stress, particularly in their structure, arrangement, design and utility.

Referring to Figs. 1, 2 and 3, the postscenium 8 is confined between the curtain 7 and the walls 10. In here is built a suitable stationary platform 11 for the reception of the various pieces of furniture and mechanism pertaining to playhouses in general, and on which may be the dressing-rooms, etc. This platform, preferably, is continuous around a central pit or opening 12, which may be of any desirable circumferential form and depth. Adaptable to be raised or lowered in the pit 12, Fig. 2, is a rigidly braced carriage 13, having an upper portion 14, covered to form a foot-way. Cables 15 are securely fastened to the vertical studs 16 of the frame, whereby it is raised or lowered by means of suitable drums 17, motor operated, to which the cables 15 are led and wound.

It is obvious that the carriage may be operated by any suitable and convenient means, as also may be the drums 17 which show a simple means for accomplishing the movement of the carriage 13. The hoisting mechanism may be located either in the pit or above the stage according to circumstances. In order to properly guide the carriage 13, rollers 18 are mounted on the several studs 16, and travel along a rail 19 (see Fig. 4) which is secured to the vertical, trussed columns 20 erected at suitable intervals around the pit 12, and designed to both guide the carriage, and support its weight, through the sheaves 21 and superstructure. The columns 20 are preferably extended out so as to be partly incased in the walls 10 of the postscenium, and thus materially reinforce the structure as a whole. Brakes 22 are also mounted on the carriage 13, comprising a wedge 23 operable between a jaw 24, and flange-rails 25 on the columns 20. A lever 26 connects at one arm to the wedge 23, and at the other arm to a nut 27 on the screw 28, which is turnable by the hand-wheel 29. When the carriage 13 is to be moved the brakes 22 are all released and power applied to the drums 17 to wind or unwind the cables 15, and when the carriage has reached the desired position, the brakes are again applied, taking the strain off of the cables, and locking it safely. The inner set of studs 16 of the carriage 13 carry an annular track 30, on which travel rollers 31 mounted on the frame of a circular, revoluble stage 32, the surface of which is substantially level with the foot-way 14. It is evident that the stage 32, supported on the track 30, is freely revoluble on its rollers 31, and will be elevated or lowered simultaneously with the carriage 13. Thus, if desirable, the different scenes to be used in a play and in an act may be erected on the stage each completely, and at one time, each scene being, in its proper sequence, presented to the auditorium, and when a particular scene is of such a nature that it should be elevated or lowered in order to increase its effectiveness, it is only necessary to elevate or lower the carriage accordingly, without dismantling the whole stage or removing any of the other scenes.

As an illustration of the effectiveness and utility of lowering the stage and scene as may be required, in Fig. 3 is shown a setting representing a mountainous background, and an intervening chasm, the bottom of which would be invisible from the audience. Upon the portion of the stage adjacent to the proscenium, a small temporary platform may be erected, as shown, on which the characters perform. It is readily seen that by this arrangement the stage and scenery can be made to produce most spectacular effects.

Heretofore, when it was desired to erect a scene having a grand staircase ascending from a lower floor to one on a level with the proscenium and stage, it was necessary to remove a portion of the usual stage floor, or to resort to the trap-door structure. The limited scale on which this is done ruins the effectiveness of the scene, but it is apparent that by the use of a stage bodily movable downwardly (or upwardly) the entire area is adaptable to the scene.

Numerous scenes may be described in which it would be immensely effective to manipulate the stage, as stated, but it is believed that the function has been sufficiently set forth.

While I have shown the footway 14 as being octagonal in plan, manifestly it may be varied to suit requirements.

Mounted and revoluble on an annular track 33, secured to the frame-work of the stage 32, is a small center stage 34, having rollers 35 running in the track 33. The surfaces of these stages 32 and 34 are practically flush with each other and are independently revoluble, but both are uniformly elevated or lowered by the carriage 13; stage 32 being carried directly by it, and the center stage 34 indirectly. Each of the revoluble stages is provided with brakes 22, which are applied to flanges on the tracks 30 and 33, when it is desirable to prevent the stages from turning.

The different scenes "set up" on the stage require each to have their own particular lighting and ceiling or sky effects. It is an object of this invention to provide means whereby the ceiling pieces, or ceiling borders, drops and other hanging pieces and all lights suspended from above, and required in a scene, may be suspended for all the scenes each completely, from the gridiron or rigging loft, the under area of which may be divided into scenes as desired, and then turned in unison, or at variance, with the stage 32, and for this purpose an upper carriage 36 is provided, having suitable means, giving it a vertical motion, and having a circular track 37 upon which run rollers 38, bearing a braced frame 39. The gridiron or rigging loft 50 from which the ceiling pieces, border-lights, etc., are suspended is constructed by suitably boarding and adapting the under side of the frame 39 to receive the various attachments and paraphernalia. Cables 40 are fastened to the carriage 36, whereby it is raised or lowered by means of drum 41, motor operated, to which the cables 40 are led. The carriage 36 is guided when elevated or lowered by rollers 42, along the track 19. It is manifest that the gridiron or rigging loft 50, supported on the track 37, is freely revoluble on its rollers 38, and will be elevated or lowered simultaneously with the carriage 36. When necessary to raise or lower the gridiron 50 and the stage 32 in synchronism a set of studs 51 or other connections shown in dotted lines, Fig. 2, may be employed.

Revolubly mounted upon the upper portion of the carriage 36 is a platform 43, which is adapted to be raised or lowered by means of the carriage 36 so that it may be used in combination with the main stage 32 to complete a setting and also as a main stage by lowering the main stage 32 to the bottom of the pit 12 and the platform 43 into the position normally occupied by the main stage, when level with the proscenium.

Means are shown by which gas, water, electricity, or compressed air may be supplied to the stage when required, comprising as shown, a reel 44 to which a supply connection 45 is made; a flexible tube 46 leads from the reel to a conductor 47, and from thence a distributer 48 connects with the stages.

Any suitable means and connections may be employed to supply the border lights or any other overhead lights used for ceiling or sky effects, and which are suspended from the rigging-loft, with gas or electricity as may be desired, from a main supply connection.

It is important that the main or orchestra floor of the auditorium should be so built, and the pitch or incline such with relation to the varying changes of the stage, that a line of sight may be had that will give the fullest effect to the scenes.

By depressing the stage, and by the proper lighting, water surfaces may be imitated with effects of light not otherwise obtainable, and plainly visible from the seats.

Any convenient form of driving device may be employed to revolve the stages 32—34, as that shown in Fig. 7, comprising a motor 30$^a$ connected by gear train 30$^b$ to drive rollers 31 or 35 as required.

Having thus described my invention, what I claim and desire to secure by Letters Patent is—

1. The combination in a theatrical structure, of independent suspended revoluble stages, and mechanism by which the said stages may be raised or lowered independently of each other.

2. The combination in a theatrical structure, of independent suspended stages, mechanism by which the said stages may be raised or lowered, and means for locking said stages in position.

3. The combination in a theatrical structure of a stage comprising a suspended non-rotary exterior portion, with means to raise and lower the same, and interior revoluble carriages with floors in the horizontal planes of the outer portions.

4. The combination in a theatrical structure, of a main stage, means to change the level with relation to the proscenium, and a circular concentric portion independently revoluble and adapted to be raised and lowered in unison with said main stage.

5. The combination in a theatrical structure, of a main stage, a carriage on which said stage is mounted, suspending cables connected to said carriage, means for winding and unwinding the cables, guide posts and sheaves whereby the horizontal relation of said stage with the proscenium is maintained, and brakes whereby the carriage may be locked at any desired point.

6. The combination in a theatrical structure, of a vertically movable main stage, vertically disposed guide columns between which said stage is adapted to travel in a vertical direction, said columns extending outwardly into the walls surrounding the said stage, and guide rollers adapted to travel on the interior vertical edges of said columns.

7. The combination in a theatrical structure, of a vertically movable carriage, proscenium, suspending cables and guides whereby said carriage may be raised or lowered with relation to the proscenium, annular tracks carried on said carriage, an interior stage mounted and revoluble upon said track, a second interior revoluble stage, and tracks and rollers by which it is independently revoluble with relation to the outer revoluble stage.

8. The combination in a theatrical structure of a revoluble gridiron or rigging loft, mechanism by which the said rigging loft may be raised or lowered, and means for locking the said rigging loft in position.

9. The combination in a theatrical structure, of a main stage, a rigging loft in a horizontal plane, a revoluble carriage on the under side of which the said rigging loft is mounted, an exterior non-revoluble carriage and floor, suspending cables and means for raising and lowering the said carriage, guide posts and sheaves whereby the horizontal relation with the main stage is maintained, and brakes whereby the carriage may be locked at any desired point.

10. The combination in a theatrical structure of a non-revoluble main stage, vertically disposed columns between which said stage is adapted to travel in a vertical direction, guide rollers adapted to travel on the interior vertical edges of said columns, suspending cables and means for raising and lowering said main stage, a revoluble rigging loft adapted to travel in a vertical direction between said columns, suspending cables and means for raising and lowering said main stage and rigging loft, said rigging loft being revoluble and vertically movable in unison with or independently of the said main stage.

11. The combination in a theatrical structure, of a suspended non-revoluble, vertically movable, exterior stage, a revoluble stage interior thereto, a vertically movable rigging loft independently suspended and revoluble and movable with relation to the said exterior stage, said interior stage and rigging loft being capable of revolving and being raised or lowered in unison.

12. The combination in a theatrical structure, of a suspended non-revoluble and vertically movable stage, a turnable independently suspended carriage, and a supplementary stage mounted thereon and movable independently of the main stage.

13. The combination in a theatrical structure of a vertically movable carriage with suspending cables and guides whereby said carriage may be raised or lowered with relation to the proscenium, annular tracks within said carriage, a circular stage mounted and revoluble upon said tracks in the horizontal plane, a second interior revoluble stage, tracks and rollers by which it is independently revoluble with relation to the exterior revoluble stage, conductors carried by the revoluble stages, and connections between said conductors and exterior fixed conductors.

14. A theatrical stage comprising independent superposed carriages, guided means to raise and lower said carriages, an exterior stage floor mounted upon the lowermost carriage, an interior revoluble floor in the same plane therewith, and a revoluble rigging loft and scenery support carried by the uppermost carriage.

15. A theatrical stage comprising independent superposed carriages, guided means to raise and lower said carriages, an exterior stage floor mounted upon the lowermost carriage, an interior revoluble floor in the same plane therewith, a revoluble rigging loft and scenery support carried by the uppermost carriage, and a stage floor mounted upon said upper carriage.

16. The combination in a theatrical structure, of a vertically movable carriage, suspending cables and guides whereby said carriage may be raised or lowered with relation to the proscenium, annular tracks carried on said carriage, a main stage mounted and revoluble upon said tracks, a second interior revoluble stage, tracks and rollers by which it is independently revoluble with relation to said main stage, and connections between the stages.

In testimony whereof I have hereunto set my hand in presence of two subscribing witnesses.

HARRY W. BISHOP.

Witnesses:
 Geo. H. Strong,
 Charles Edelman.

---

Copies of this patent may be obtained for five cents each, by addressing the "Commissioner of Patents, Washington, D. C."